United States Patent
Lee et al.

(10) Patent No.: US 8,019,016 B1
(45) Date of Patent: Sep. 13, 2011

(54) SYSTEM AND METHOD OF TRANSMIT BEAM SELECTION

(75) Inventors: Jungwon Lee, Cupertino, CA (US);
Hongyuan Zhang, Sunnyvale, CA (US);
Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 807 days.

(21) Appl. No.: 12/110,925

(22) Filed: Apr. 28, 2008

Related U.S. Application Data

(60) Provisional application No. 60/914,479, filed on Apr. 27, 2007.

(51) Int. Cl.
*H04L 27/00* (2006.01)

(52) U.S. Cl. ................................ 375/299; 455/562.1

(58) Field of Classification Search .................. 375/347, 375/267, 299; 455/562.1, 561, 63.4, 63.1, 455/101; 381/92; 370/336, 329; 367/122, 367/138; 342/377, 375, 373
See application file for complete search history.

(56) References Cited

U.S. PATENT DOCUMENTS

| | | | | |
|---|---|---|---|---|
| 7,809,074 | B2 * | 10/2010 | Kotecha et al. | 375/267 |
| 7,822,128 | B2 * | 10/2010 | Maltsev et al. | 375/260 |
| 2006/0133530 | A1 * | 6/2006 | Kwak et al. | 375/267 |

OTHER PUBLICATIONS

IEEE P802.11, Wireless LANs, May 2005, 131 pages.

* cited by examiner

*Primary Examiner* — Kevin Y Kim

(57) ABSTRACT

A system and method of beamforming facilitate beam selection without requiring an exhaustive search. In some implementations, a beamforming technique may select candidate vectors to construct a beamforming matrix without having to compute each matrix element.

20 Claims, 4 Drawing Sheets

SYSTEM AND METHOD OF TRANSMIT BEAM SELECTION

CROSS-REFERENCE TO RELATED APPLICATIONS

The present application claims the benefit of U.S. provisional application Ser. No. 60/914,479, filed Apr. 27, 2007, entitled "Transmit Beam and Antenna Selection for MIMO Systems," the disclosure of which is incorporated herein by reference in its entirety.

The present application is also related to co-owned U.S. patent application Ser. No. 12/044,117, filed Mar. 7, 2008, entitled "Codebook Selection Algorithm for Transmit Beamforming," and U.S. patent application Ser. No. 12/062,462, filed Apr. 3, 2008, entitled "System and Method of Beamforming with Reduced Feedback," the disclosures of which are incorporated herein by reference in their entireties.

BACKGROUND

1. Field of the Invention

Aspects of the present invention relate generally to wireless communication techniques, and more particularly to a system and method of beamforming that select candidate vectors to construct a beamforming matrix.

2. Description of Related Art

Recently, the wireless communication industry has demonstrated an increasing interest in beamforming techniques for use in connection with multiple input, multiple output (MIMO) systems. For example, MIMO beamforming systems have been considered in standards promulgated by the Institute of Electrical and Electronics Engineers (IEEE), most notably the IEEE 802.11n standard for wireless local area networks (WLANs). One advantage of beamforming methodologies is that they can increase the data rate between networked devices without the attendant increase in transmit power or bandwidth that would be necessary to achieve a similar data rate in MIMO systems without beamforming.

One relatively popular beamforming approach uses singular value decomposition (SVD) techniques. However, this method requires a lot of feedback information (i.e., signal information transmitted from the receive device back to the beamforming transmit device). Conventional SVD beamforming also introduces transmit power fluctuations among antennae; thus, traditional beamforming strategies may not efficiently satisfy a per-antenna transmit power constraint.

Therefore, it may be desirable in some instances to provide a beamforming technique that requires significantly less feedback information than the SVD beamforming technique; additionally, it may be desirable to provide a beamforming strategy that does not require an exhaustive search for every element of a beamforming matrix.

SUMMARY

Embodiments of the present invention overcome the above-mentioned and various other shortcomings of conventional technology, providing a system and method of beamforming that facilitate beam selection without requiring an exhaustive search. In some implementations, a beamforming technique may select candidate vectors to construct a beamforming matrix without having to compute each matrix element.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Introduction

The beamforming techniques described below may be utilized for flat fading channels as well as for frequency selective fading channels with orthogonal frequency division multiplexing (OFDM). For simplicity, the beamforming techniques are explained in the context of single carrier systems for flat fading channels; those of skill in the art will appreciate that the disclosed methodologies may readily be extended to be implemented in OFDM systems.

In some implementations, the receive signal may be modeled as $$y = Hx + z \quad \text{(Equation 1)}$$

$$y = [y_1 \ldots y_{N_R}]^T \quad \text{(Equation 2)}$$

where $$H = \begin{bmatrix} h_{1,1} & \cdots & h_{1,N_T} \\ \vdots & \ddots & \vdots \\ h_{N_R,1} & \cdots & h_{N_R,N_T} \end{bmatrix} \quad \text{(Equation 3)}$$

$$x = [x_1 \ldots x_{N_T}]^T \quad \text{(Equation 4)}$$

$$z = [z_1 \ldots z_{N_R}]^T \quad \text{(Equation 5)}$$

In this model, $x_t$ is a transmit signal from a transmit antenna, t, $z_r$ is the noise in a receive antenna, r, H is the instantaneous channel matrix where $h_{r,t}$ is a channel gain from transmitter, t, to receiver, r, and $N_R$ and $N_T$ are the number of receive and transmit antennae, respectively. Additionally, $N_S$ may represent the number of transmit streams, which should be constrained such that $N_S \leq \min\{N_R, N_T\}$.

In many cases, the transmit signal vector, x, is generated by linearly processing a data vector, d, with a transmit beamforming matrix, B:

$$x = Bd \quad \text{(Equation 6)}$$

where the data vector d is $$d = [d_1 d_2 \ldots d_{N_S}]^T \quad \text{(Equation 7)}$$

In Equation 7, $d_s$ generally represents a data symbol for a stream, s, and $N_S$ represents the number of streams, as noted above. The matrix B specifies how the data streams are mapped to the transmit antennae, and it can also be thought of as a beamforming matrix, each column of which represents a transmit beam for a respective data stream.

It will be appreciated that receiver performance may be affected by the manner in which a transmit beamforming matrix, B, is selected. Accordingly, overall system data throughput and reliability may be influenced by appropriate selection of the transmit beamforming matrix. One conventional way of selecting a beamforming matrix generally involves using singular value decomposition (SVD) on the channel, H. However, the SVD approach is usually computationally complex, and it requires a significant amount of feedback in the case of explicit beamforming. So, in practical situations, it may be desirable to provide a beamforming scheme that minimizes or otherwise limits the number of candidate beams (or candidate vectors for the beamforming matrix) that need to be searched.

Figure 1A:
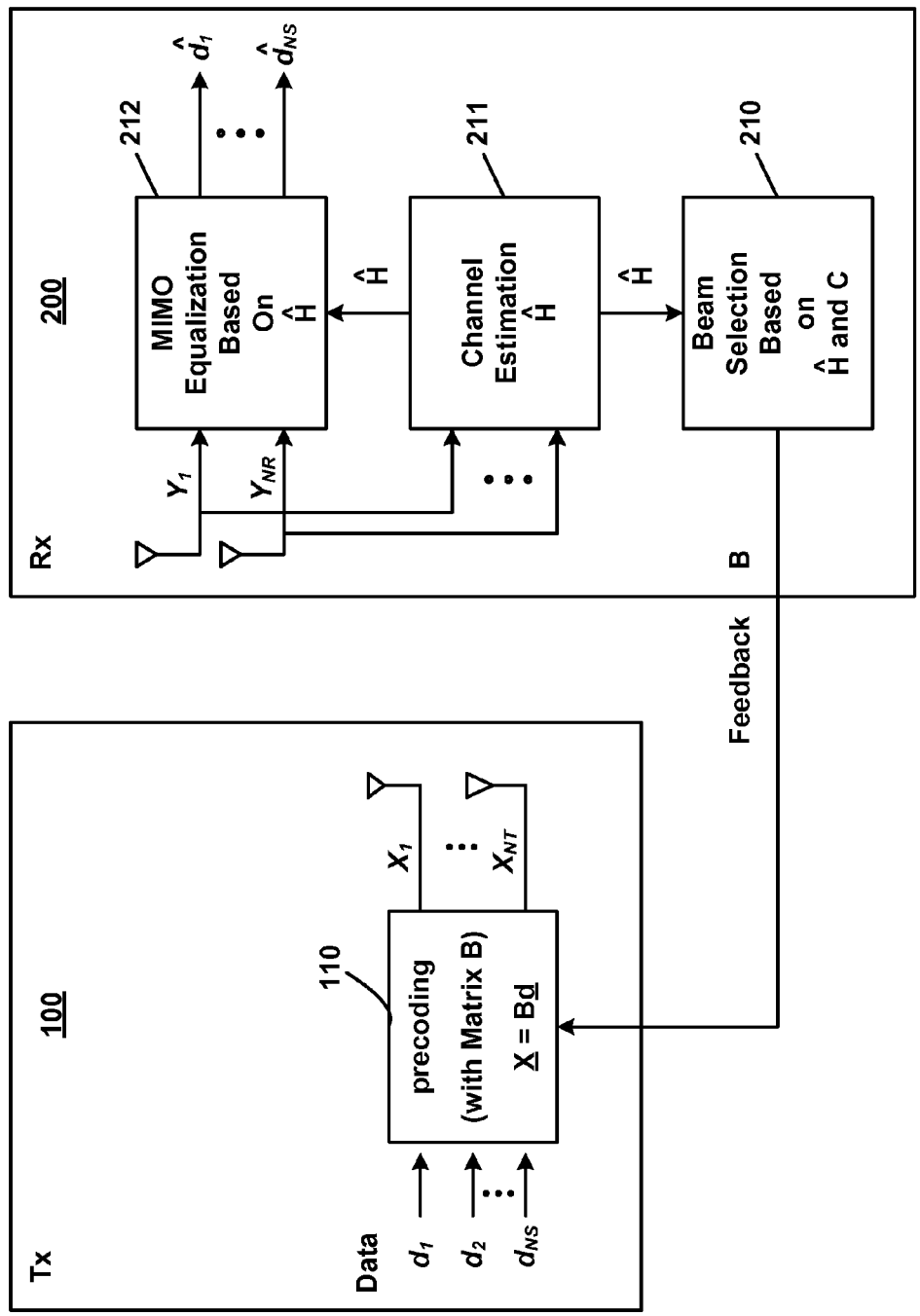
FIGS. 1A and 1B are simplified diagrams illustrating components of a transmitter and a receiver employing embodiments of a system and method of transmit beam selection.
Figure 1B:
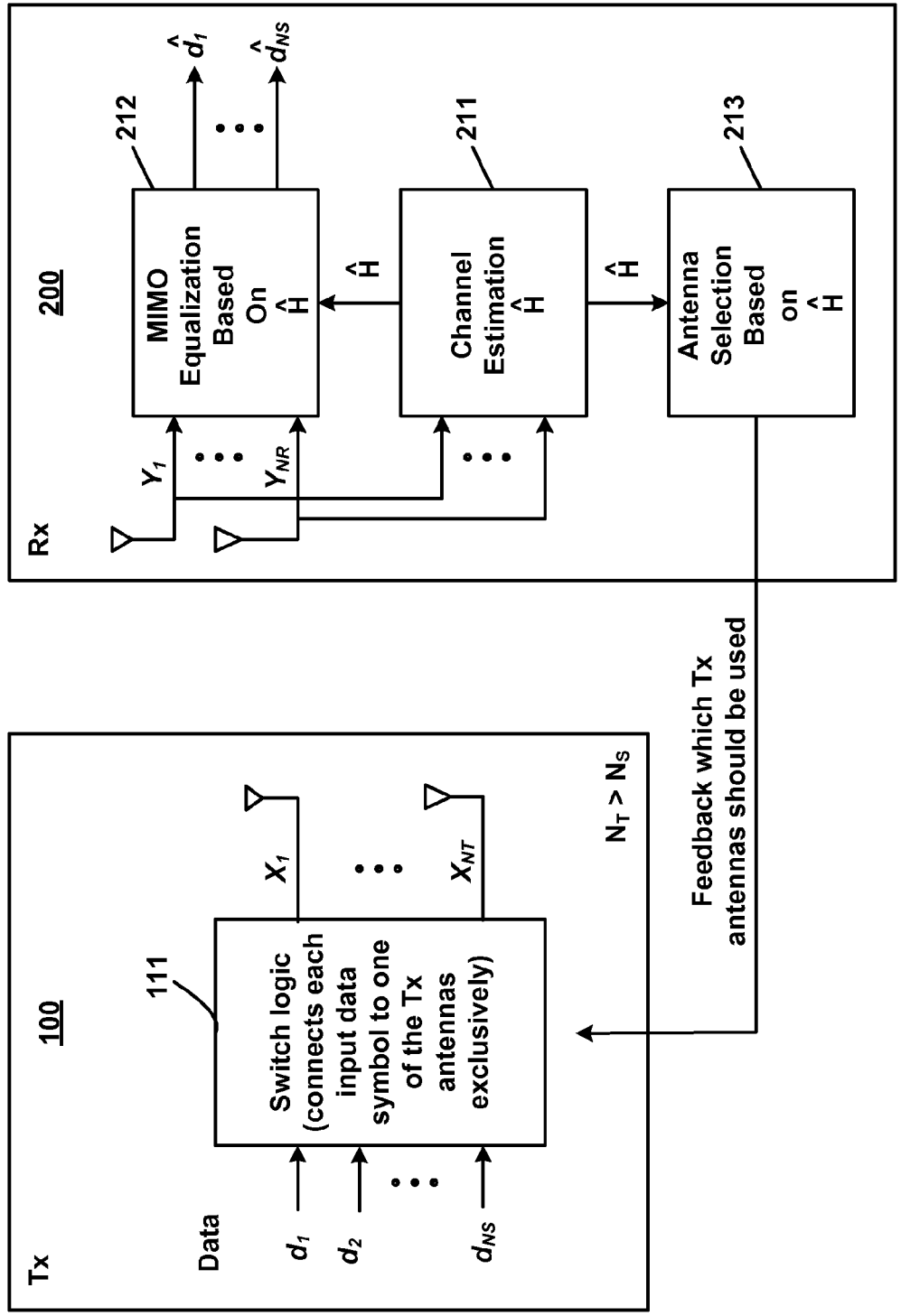

Turning now to the drawing figures, FIGS. 1A and 1B are simplified diagrams illustrating components of a transmitter and a receiver employing embodiments of a system and method of transmit beam selection. In some embodiments, the functional blocks illustrated may be implemented as hardware components. For example, the various elements of receiver 200 may be integrated into a single, monolithic integrated circuit (IC) or an application specific IC (ASIC). Additionally or alternatively, some or all of the functional blocks may be implemented independently (i.e., on multiple ICs or chips), for instance, using programmable logic hardware or more than one ASIC. In some implementations, various of the elements may be programmable or otherwise configurable in accordance with system requirements, communications protocols, and other factors affecting desired or necessary operational characteristics of transmitter 100, receiver 200, or both. In that regard, some of the functional blocks of transmitter 100 or receiver 200 may be implemented in software or other encoded instruction sets, for example, executed by a microprocessor or microcontroller (not illustrated in the drawing figure). Accordingly, the term "module" in the context of the following description is intended to encompass both hardware and software embodiments of a particular functional block; those of skill in the art will appreciate that any number of software applications or instruction sets, and various circuitry or hardware components supported by firmware may readily be designed to support the functionality set forth below.

Transmitter 100 generally comprises a plurality of transmit antennas ($X_1 \ldots X_{NT}$). In some implementations, such as illustrated in FIG. 1A, a transmit vector generation module 110 may be configured and operative to construct a transmit signal in accordance with a beamforming matrix substantially as set forth above with reference to Equations 6 and 7. Alternatively, where feedback from the beamformee is in the form of an indication as to which transmit antenna should be used as indicated in FIG. 1B, transmitter may include switch logic 111 or an equivalent module operative selectively to connect each input data symbol to one of the transmit antennas $X_1 \ldots X_{NT}$ exclusively, in accordance with the feedback signal.

Similarly, individual Inverse Fast Fourier Transform (IFFT) modules 140 and parallel to serial modules 150 may transform to the time domain and format, respectively, each data stream for transmission. Following addition of a cyclic prefix at module 160, data streams (e.g., $x_1$, $x_2$, etc.) may be transmitted in a conventional manner. In that regard, the architecture of the FIG. 1 embodiment may have utility in systems operating in accordance with various communications protocols such as, but not limited to, IEEE 802.11n (WLAN) or Wireless Fidelity (WiFi) systems, Worldwide Interoperability for Microwave Access (WiMAX) systems, and various OFDM networks.

It is noted that transmitter 100 may generally comprise additional components not illustrated in FIGS. 1A and 1B. For example, transmitter 100 may include a sounding signal generation module to construct a sounding signal that allows a receiver to estimate the full-dimensional MIMO channel, from which the beamforming matrix may be derived. Transmitter 100 may also include baseband modules, modulators, local oscillators or frequency references, and other components generally known in the art of wireless communications, such as, but not limited to: Inverse Fast Fourier Transform (IFFT) modules and parallel to serial modules operative to transform to the time domain and to format, respectively, each data stream for transmission. Transmitter 100 may also comprise an equalizer to perform equalization on the effective channel matrix substantially as set forth below; such an equalizer may implement any of various types of known equalization techniques. In some embodiments, transmitter 100 may also comprise a signal to noise ratio calculation unit to calculate a respective signal to noise ratio for each beam in the equalized effective channel matrix as set forth in detail below.

It will be appreciated that receiver 200 operative to communicate with transmitter 100 may comprise modules that are similar to those implemented at transmitter 100. For example, receiver 200 may comprise a beamforming matrix module 210 that is capable of performing the functionality described below for constructing, calculating, or otherwise selecting a beamforming matrix to be fed back to transmitter 100. In that regard, receiver 200 may include a channel estimation module 211 to calculate a channel estimate from a transmit signal received from transmitter 100; such a channel estimate may have utility in calculating a beamforming matrix. In some embodiments, the functionality of modules 210 and 211 may be integrated into a single module, hardware component, or functional block; in particular, as set forth below, a beamforming matrix module 210 may be operative to construct an effective channel matrix, therefore performing the functionality illustrated as performed by module 211. In the embodiment of FIG. 1B, an antenna selection module 213 may feedback a signal to transmitter 100 indicating which transmit antenna to use as a function of the channel estimate. As indicated in FIGS. 1A and 1B, receiver 200 may also comprise an equalizer module 212; the functionality of equalizer module 212 is set forth in detail below.

Additionally, receiver 200 may comprise suitable antenna and transmitter hardware, as well as appropriate serializer, de-serializer, and transform modules enabling bi-directional data and other communications. As noted above with reference to transmitter 100, such modules implemented in receiver 200 may be embodied in hardware (such as dedicated circuitry, programmable logic, or ASIC hardware) or software applications or instruction sets executed by a microprocessor or microcontroller. Further, components of receiver 200 may readily be implemented in transmitter 100 in some embodiments. For example, beamforming matrix module 210 may be disposed in transmitter 100, and receiver 200 may be configured to feedback the channel estimate, rather than the matrix, B, to transmitter 100. Similarly, both channel estimation module 211 and beamforming matrix module 210 may be implemented at transmitter 100; in this case, the channel may be assumed to be reciprocal (i.e., the uplink channel is equivalent to the downlink channel). Similar variations may employ antenna selection module 213 at the transmit side.

The architectures illustrated in FIGS. 1A and 1B may have utility in systems operating in accordance with various communications protocols such as, but not limited to, IEEE 802.11n (WLAN) or Wireless Fidelity (WiFI) systems, Worldwide Interoperability for Microwave Access (WiMAX) systems, and various OFDM networks. The architectures are provided by way of background only; it will be appreciated that the following beamforming protocol may be employed by the illustrated arrangements or other suitably configured architectures.

Implementation

In accordance with some embodiments, a transmit beamforming matrix, B, may be constructed by selecting $N_s$ columns of a transmit beam candidate matrix, C. The dimensions of the candidate matrix are generally $N_T \times N_C$ where $N_C$ represents the total number of candidates. The transmit beam candidate matrix, C, is generally given (i.e., predetermined), and may vary in accordance with overall system requirements or design, such as transmit power constraints, number of antennae, and so forth. As set forth in more detail below, each column (as a discrete unit) of candidate matrix, C, may be selected as a candidate vector for a respective column of the beamforming matrix; accordingly, it may not be necessary to compute each element of the beamforming matrix, since each column is treated independently.

Selection of a transmit beamforming matrix may be executed at a transmitter (or "beamformer"), for instance, with knowledge of the forward channel which is generally available through feedback, or through sounding of the backward channel, assuming channel reciprocity. In many instances, even though channel reciprocity does not hold due to radio frequency (RF) chains and other factors, the forward channel may nevertheless be estimated from the backward channel estimate by executing various calibration techniques. Additionally or alternatively, the transmit beamforming matrix may be executed at the receiver (or "beamformee"), which generally has channel knowledge through sounding of the forward channel.

Whether the transmit beamforming matrix is selected at the transmitter or at the receiver, it may be assumed that the selection is informed by knowledge of both the channel, H, and the transmit beam candidate matrix, C, or with knowledge of the combined effective channel $H_e \triangleq HC$.

A special case of beamforming matrix selection arises when the transmit beam candidate matrix, C, is given as an identity matrix, i.e., $C=I_{NT}$; this represents a situation in which the problem of matrix selection degenerates into simple selection of transmit antennas. In that regard, the methodologies set forth herein are general enough to address both the problem of transmit antenna selection as well as the problem of transmit beamforming matrix selection as set forth in more detail below.

With the transmit beamforming matrix, B, the model described above may be expressed as follows (combining Equations 1 and 6):

$$y = HBd + z \quad \text{(Equation 8)}$$

Given the relationship defined in Equation 8, it may be desirable to construct matrix, B, such that receiver performance may be maximized for a given receiver type. It will be appreciated that the best beamforming matrix may generally depend upon, among other factors, the type and functionality of a multiple input, multiple output (MIMO) equalizer employed by the beamformee. Examples of MIMO equalizers include, but are not limited to: zero-forcing (ZF) linear equalizers (LEs); minimum mean square error (MMSE) LEs; ZF decision feedback equalizers (DFEs); and MMSE DFEs. A maximum likelihood receiver may also be employed. In the following example, it is assumed that the beamformee is implementing a ZF linear equalizer, though the present disclosure is not intended to be limited by the nature or architectural and operational characteristics of the equalizer utilized at the beamformee.

Transmit Beam Selection

Figure 2:
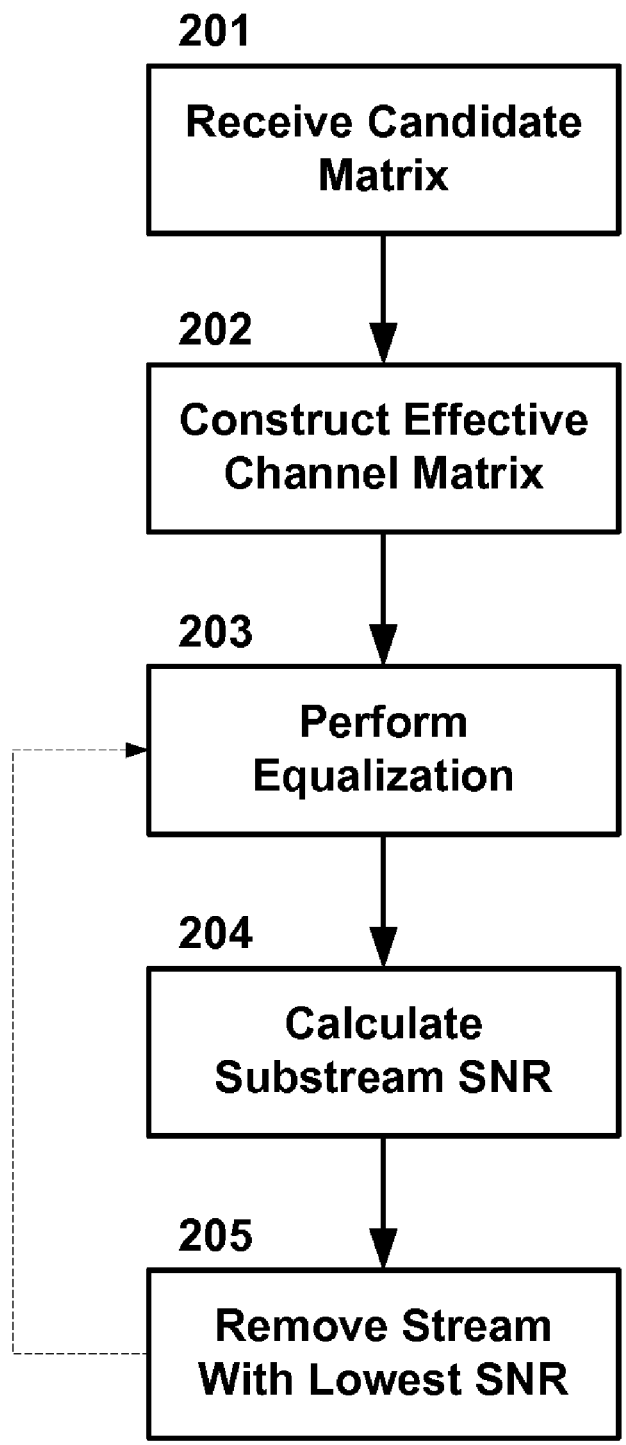
FIG. 2 is a simplified flow diagram illustrating operation of one embodiment of a beamforming method that selects candidate vectors to construct a beamforming matrix.
Figure 3:
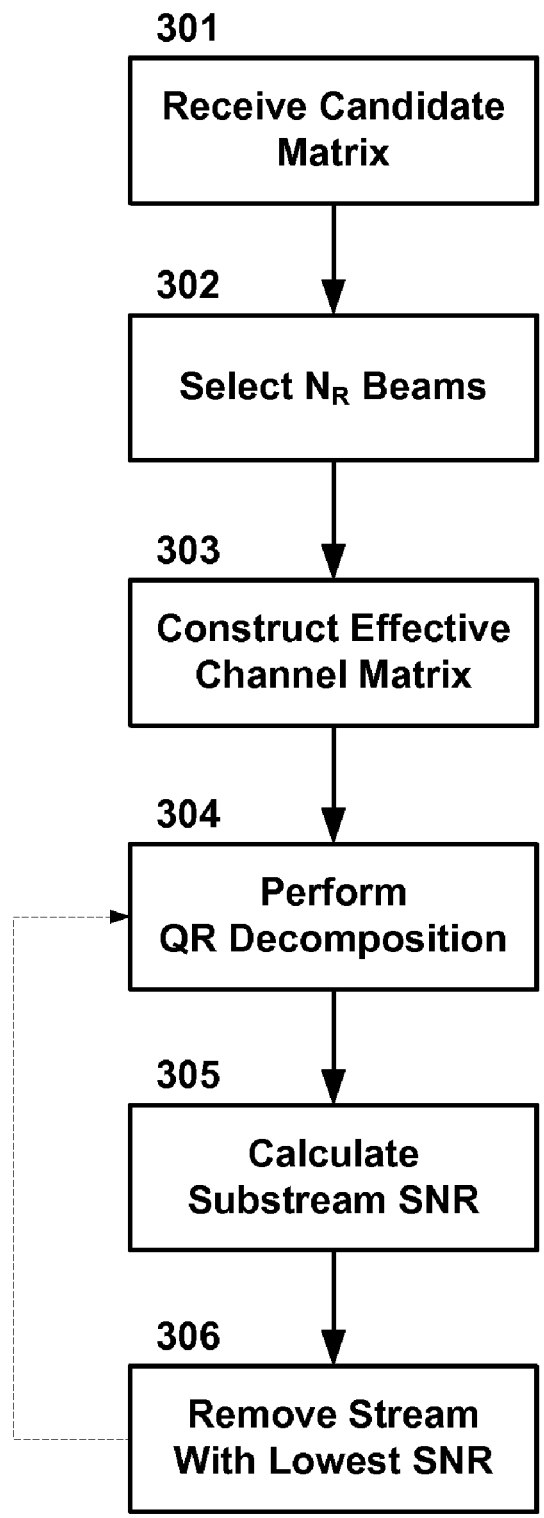
FIG. 3 is a simplified flow diagram illustrating operation of another embodiment of a beamforming method that selects candidate vectors to construct a beamforming matrix.

FIGS. 2 and 3 are simplified flow diagrams illustrating operation of embodiments of beamforming methods that select candidate vectors to construct a beamforming matrix. One example, illustrated in FIG. 2, involves a situation in which the number of candidates, $N_C$, is less than or equal to the number of receive antennas, $N_R$, such that the rank of the transmit beam candidate matrix, C, is $N_C$. Another example, illustrated in FIG. 3, involves a situation in which the number of candidates, $N_C$, is greater than the number of receive antennas, $N_R$.

As noted above, it may be desirable to select columns from the candidate matrix that construct a beamforming matrix suitable for a particular receiver. In some embodiments, a greedy transmit beam selection algorithm may simply remove one column vector at a time, starting from the full effective channel matrix, $H_e=HC$. One criterion that may have particular utility for column removal is the substream SNR.

In accordance with the FIG. 2 embodiment, a method of transmit beam selection may begin with receiving a candidate matrix as indicated at block 201. As set forth above, the candidate matrix may represent a series of column vectors, each of which may represent a candidate column to be used to construct the beamforming matrix. The candidate matrix may be given, or predefined, and may be selected in accordance with desired or required overall system constraints. As set forth above, the candidate matrix may be an identity matrix in some implementations. The candidate matrix may be used to construct an effective channel matrix, $H_e$ (e.g., by multiplying the candidate matrix with the instantaneous channel matrix), as indicated at block 202.

Equalization may be performed as indicated at block 203. Such equalization may be based on the effective channel matrix. It will be appreciated that, at least initially, all columns of C may be selected for the first iteration through the loop illustrated in FIG. 2, i.e., initially, the dimensions of $H_e$ will be $N_R \times N_C$. Many different types of equalization techniques exist, and may be suitable for various applications. The equalization performed at block 203 may be executed in accordance with the nature or operational characteristics of the equalizer employed by the beamformee, for instance. By way of example, in the case of ZF linear equalizers (which are commonly employed), a QR decomposition algorithm may be executed, however, the present disclosure is not intended to be limited to any particular equalization technique.

As indicated at block 204, a respective substream SNR may be calculated for each of $N_T$ beams, assuming that each of the other beams (represented by the respective columns of $H_e$) are present. As is generally known, SNR calculations may depend upon, among other factors, the equalization technique employed at block 203, i.e., the calculating (at block 204) may be executed responsive to the equalization (at block 203). In some implementations, it may be desirable to remove the column of $H_e$ that corresponds to the beam having the lowest substream SNR as indicated at block 205. Having modified the matrix $H_e$ by removing a column representing the beam with the lowest SNR, the process may loop back to block 203 (as indicated by the dashed arrow in FIG. 2) where additional equalization may be performed on the modified matrix.

In the foregoing manner, transmit beam selection may be greatly simplified. The strategy illustrated in FIG. 2 may simply remove the beam that has the smallest SNR based on the heuristic reasoning that this beam will probably have a small norm, will severely interfere with other beams, or both. This strategy avoids an exhaustive search for every element in the beamforming matrix, and reduces attendant computational overhead.

Another advantage of this transmit beam selection strategy is that it does not require any additional mechanism or modification to existing hardware, other than implementing the selection and removal of the beam having the lowest SNR. In that regard, the receiver of the beamformee already has a MIMO equalizer, and already has a capability of calculating substream SNR if the receiver does soft decoding. Thus, all the beamformee needs to do for transmit beam selection is to calculate substream SNR values iteratively with a shrinking beamforming matrix (as described above) and to select a beam having the lowest substream SNR for elimination at each iteration.

Turning now to FIG. 3, it will be appreciated that in some instances the number of candidate beams, $N_C$, may be greater than the number of receive antennas, $N_R$. In this case, a method of transmit beam selection may also begin by receiving a candidate matrix at block 301; this operation may be substantially identical to that described with reference to block 201 in FIG. 2. The FIG. 3 embodiment may additionally include limiting the candidate matrix to a predetermined number of columns (e.g., selecting an initial $N_R$ beams out of the $N_C$ candidates) as indicated at block 302. In particular, it may be desirable to select a set of $N_R$ beams which exhibits the maximum sum of substream SNRs over all candidate beams. Alternatively, it may be desirable to select a set of $N_R$ beams which exhibits the maximum sum of substream SNRs over the largest $N_S$ beams. By pre-selecting a number of candidates equal to the number receive antennae, the algorithm described above may be employed.

The FIG. 3 embodiment includes an equalization procedure including QR decomposition (as indicated at block 304) though other equalization techniques may be employed depending, for example, upon the characteristics of the equalizer implemented at the receiver. In some embodiments, QR decomposition may be performed on $H_e=QR$, where $H_e$ is the effective channel matrix constructed from the candidate matrix (block 303). In such instances, a respective substream SNR may be computed for each beam (as indicated at block 305) based on the matrix, R. In that regard, it is noted that all necessary information on the channel may be found in the matrix, R, such that the Q matrix may be ignored. The column of R that corresponds to the stream having the lowest SNR may be removed (block 306), and the modified matrix may be denoted as $\tilde{R}_1$. The iterative nature of the procedure is indicated by the dashed arrow back to block 304.

In implementations employing a ZF-LE, given the matrix R, the SNR of the $i^{th}$ substream may be computed based on the Euclidean norm of the row of the Pseudo-inverse of matrix R:

$$\eta_i = \frac{\rho}{N_C \|r_i\|^2} \quad \text{(Equation 9)}$$

where $\rho$ is the average receive pre-processing SNR at one receive antenna, and $r_i$ is the $i^{th}$ row of the Peudo-inverse of matrix R.

In the simplest case of $N_c=N_R=2$, R may be expressed as $$R = \begin{bmatrix} r_{11} & r_{12} \\ & r_{22} \end{bmatrix} \quad \text{(Equation 10)}$$

and $$\eta_1 = \frac{\rho}{2\left(\frac{1}{r_{11}^2} + \frac{|r_{12}|^2}{r_{11}^2 r_{22}^2}\right)}; \eta_2 = \frac{\rho}{2\left(\frac{1}{r_{22}^2}\right)} \quad \text{(Equation 11)}$$

Therefore, antenna selection may be calculated by removing the column from R with the index satisfying $$i_{RM} = \operatorname{argmin}_i \eta_i.$$

The foregoing procedures are easily extendable for larger number of channel dimensions. Also, similar substream SNR expressions may be derived for other equalizer types such as MMSE-LE, ZF-DFE, and MMSE-DFE.

In particular, for $i=2$ to $N_T-N_S$: a QR decomposition may be performed on $\tilde{R}_{i-1}$, with the new upper triangular matrix being denoted $R_i$; and the column of $R_i$ that corresponds to the beam having the lowest SNR may be removed, with the modified matrix being noted as $\tilde{R}_i$. This algorithm may reduce the number of columns in the beamforming matrix to $N_S$. The foregoing technique is simple to implement with receivers using ZF linear equalizers, and may readily be executed with existing hardware.

In many cases, QR decomposition may be achieved using Givens rotation. In that case, the QR decomposition on $\tilde{R}_i$ is of low complexity because the matrix is already very close to the upper triangular matrix. For example, consider the case of $N_T=4$ with $R_1$ as follows:

$$R_1 = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \quad \text{(Equation 12)}$$

Assume that the beam that corresponds to the second column from the left has the lowest SNR. Then $\tilde{R}_1$ may be expressed as:

$$\tilde{R}_1 = \begin{bmatrix} r_{11} & r_{13} & r_{14} \\ 0 & r_{23} & r_{24} \\ 0 & r_{33} & r_{34} \\ 0 & 0 & r_{44} \end{bmatrix} \quad \text{(Equation 13)}$$

With Givens rotation, only the elements $r_{23}$, $r_{33}$, $r_{34}$, and $r_{44}$ need to be processed. In that regard, the Givens rotation need only be applied to the diagonal elements and sub-diagonal elements in the columns located to the right of the column that has been removed. Furthermore, the processing on $r_{33}$ and $r_{44}$ will be simple because these elements are real numbers.

Here, the QR decomposition approach may have particular utility, since it may be easily implemented by the COrdinate Rotation Digital Computer (CORDIC) algorithm, a hardware technology well-known in circuit design for realizing Givens rotations. Therefore, powered by CORDIC algorithm, the proposed beam selection method set forth herein may be implemented by dedicated hardware (e.g., by a field programmable gate array (FPGA) or an ASIC) for true fast and real-time processing, although it may also be advantageous (regarding speed, delay, and other performance characteristics) for use in connection with conventional software DSP realizations.

In sum, a greedy transmit beam selection algorithm may remove beams, one by one, starting from the full effective channel matrix constructed from the full candidate matrix. At each iteration of the beam removal process, a column representing the beam that corresponds to the lowest SNR may be removed from the beamforming matrix. The disclosed system and method are appealing to the extent that they introduce minimal change to receiver hardware, particularly with respect to receivers that employ MIMO equalizers and have the capability to calculate substream SNR values. Even when beam selection is executed at the transmitter, the transmitter usually has a receiver part and can reuse the receiver MIMO equalizer and substream SNR calculation unit for the transmit beam selection. As set forth above, an algorithm for ZF linear equalizers may be based on QR decomposition. This strategy may be applied to many different MIMO equalizers such as those implementing ZF-LE, MMSE-LE, ZF-DFE, and MMSE-DFE technologies. Finally, the disclosed transmit beam selection strategy may be directly applied to the transmit antenna selection problem given a particular candidate matrix.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of constructing a beamforming matrix; said method comprising:
    receiving a candidate matrix;
    constructing an effective channel matrix using the candidate matrix;
    performing equalization on the effective channel matrix;
    calculating a respective signal to noise ratio for each beam in the effective channel matrix;
    responsive to said calculating, modifying the effective channel matrix by removing a column; and
    selectively repeating said performing equalization, said calculating, and said removing.

2. The method of claim 1 wherein the candidate matrix is predefined.

3. The method of claim 2 wherein the candidate matrix is an identity matrix.

4. The method of claim 1 wherein said constructing comprises multiplying the candidate matrix with an instantaneous channel matrix.

5. The method of claim 1 wherein said performing equalization is executed in accordance with characteristics of an equalizer employed at a receiver.

6. The method of claim 5 wherein the equalizer is a linear equalizer and wherein said performing equalization comprises executing a QR decomposition technique.

7. The method of claim 1 wherein said calculating is responsive to said performing equalization.

8. The method of claim 1 wherein said removing comprises removing a column of the effective channel matrix corresponding to a beam having a lowest signal to noise ratio.

9. The method of claim 1 further comprising limiting the candidate matrix to a predetermined number of columns.

10. The method of claim 9 wherein said limiting comprises pre-selecting a number of columns in the candidate matrix equal to a number of antennae utilized by a receiver.

11. A beamformer comprising:
    a beamforming matrix module to construct an effective channel matrix using a candidate matrix;
    an equalizer to perform equalization on the effective channel matrix; and
    a signal to noise calculation unit to calculate a respective signal to noise ratio for each beam in the equalized effective channel matrix;
    wherein said beamforming matrix module is to remove a column of the equalized effective channel matrix responsive to the calculated respective signal to noise ratios.

12. The beamformer of claim 11 wherein the candidate matrix is predefined.

13. The beamformer of claim 12 wherein the candidate matrix is an identity matrix.

14. The beamformer of claim 11 wherein said beamforming matrix module multiplies the candidate matrix with an instantaneous channel matrix to construct the effective channel matrix.

15. The beamformer of claim 11 wherein said equalizer performs equalization in accordance with characteristics of a beamformee equalizer employed at a receiver.

16. The beamformer of claim 15 wherein said equalizer is a linear equalizer.

17. The beamformer of claim 16 and wherein said equalizer executes a QR decomposition technique.

18. The beamformer of claim 15 wherein said equalizer is a decision feedback equalizer.

19. The beamformer of claim 11 wherein said beamforming matrix module is to remove a column of the equalized effective channel matrix corresponding to a beam having a lowest signal to noise ratio.

20. A beamformer comprising an apparatus operative to perform the method of claim 1.

* * * * *